United States Patent [19]

Ohta et al.

[11] 4,152,055
[45] May 1, 1979

[54] DEVICE FOR INDICATING LIGHT AND PHOTOFLASH CIRCUIT CONDITIONS IN CAMERA

[75] Inventors: Yoshiharu Ohta, Izumi; Shinji Tominaga, Sakai, both of Japan

[73] Assignee: Minolta Camera Kabushiki Kaisha, Osaka, Japan

[21] Appl. No.: 798,416

[22] Filed: May 19, 1977

[30] Foreign Application Priority Data

Jun. 1, 1976 [JP] Japan .................................. 51-71373

[51] Int. Cl.$^2$ ..................... G03B 7/08; G03B 15/05
[52] U.S. Cl. ................................... 354/32; 354/60 L
[58] Field of Search ................ 354/32, 33, 34, 53, 354/60 E, 60 L, 145, 289

[56] References Cited

U.S. PATENT DOCUMENTS 3,688,664  9/1972  Mashimo ............................. 354/33

FOREIGN PATENT DOCUMENTS 4923869  6/1974  Japan.

*Primary Examiner*—Gellner Michael L.
*Attorney, Agent, or Firm*—Wolder, Gross & Yavner

[57] ABSTRACT

A device for visually indicating the camera incident light conditions and the readiness of an associated photoflash network on a single element includes an incandescent indicating lamp connected through parallel transistors to a current source. One transistor is controlled in response to the light incident on a photoconductor to apply a steady current to the lamp when the photoconductor incident light is below a predetermined level. The other transistor is controlled by a relax action oscillator including the photoflash triggering capacitor to apply an intermittent current at a visually perceptable frequency to the lamp when the charge on the photoflash main capacitor is at least at a predetermined value. The lamp is advantageously located as to be visible through the camera view finder.

15 Claims, 1 Drawing Figure

DEVICE FOR INDICATING LIGHT AND PHOTOFLASH CIRCUIT CONDITIONS IN CAMERA

BACKGROUND OF THE INVENTION

The present invention relates generally to improvements in cameras incorporating an electronic flash unit, or in cameras with which a separate electronic flash unit is associated and it relates more particularly to an improved indicating device for use in a camera of the above type, which device may indicate the completion of the charge of the main capacitor in the flash circuit, along with whether or not the brightness of an object to be photographed is over or under a predetermined level.

The Japanese Utility Model Application published with the Publication No. SHO 49-23869 describes a device which provides the foregoing two types of indication. According to this conventional device, when the brightness of an object is under a given level, then an indicator lamp is lit, and when a main capacitor in an associated flash circuit is charged to a given charge voltage, then the lamp is extinguished. As a result, for example, in the case of the main capacitor being charged irrespective of the brightness of an object for utilizing the flash light as an auxiliary light with the daylight photography, even if the charge on the main capacitor is insufficient, the lamp remains unlit, when the brightness of the object to be photographed is over a given level. In addition, the indicating device provides an indication representing a normal condition, when the lamp is extinguished, so that the photographer cannot discriminate between the case where the lamp remains unlit, under normal operating conditions of the indicating means and the case where a lamp remains unlit due to an insufficient power source voltage or a defect in the indicating device, and thus the photographer cannot properly determine the true cause.

Thus, the indicating device of the nature explained above as well as other such indicating devices heretofore available and proposed leave much to be desired.

SUMMARY OF THE INVENTION

It is a principal object of the present invention to provide an improved camera indicating or warning device.

Another object of the present invention is to provide in a camera having a self-contained or separable electronic photoflash unit an improved device for providing an indication of the camera incident light conditions and the condition of readiness of the photoflash unit.

It is still another object of the present invention to provide an indicating device for use in a camera of the type described, in which completion of the charge on the photoflash capacitor is positively indicated irrespective of the brightness of the object, and yet an exposure indication is given by a charge completion indicating element in a different manner from that representing the completion of the charge.

A further object of the present invention is to provide a device of the above nature characterized by its reliability, simplicity, ease of operation and great versitility and adaptability.

The above and other objects of the present invention will become apparent from a reading of the following description taken in conjunction with the accompanying drawing which illustrates a preferred embodiment thereof.

In a sense, the present invention comtemplates the provision in a camera provided with an electronic photoflash unit including a main flash capacitor of an indicator device comprising a photosensitive element, means responsive to said photosensitive element for producing a first electrical signal, means responsive to the charge on said capacitor for producing a second electrical signal, one of said signals being a steady state signal and the other signal being an oscillator signal at a frequency in the range of visual perception, an electrically energized light emitting member, and means responsive to both said signals for energizing said light emitting member.

In its preferred form, the improved indicating device includes an incandescent lamp connected through a pair of parallel transistors to a source of current, one of the transistors being controlled so as to be on and off as the light incident on the photosensitive element which is a photoconductor is below and above a predetermined level respectively. The other transistor is controlled by the output of an RC relaxation oscillator including the photoflash triggering capacitor as the capacitor component thereof, producing an output when the photoflash main capacitor is at least in a predetermined charge. With the improved device the observer can readily and reliably determine the object light conditions as well as the conditions of readiness of the photoflash unit. Moreover, the device is highly reliable, simple, rugged and highly adaptable and overcomes the drawbacks and disadvantages of earlier devices.

DESCRIPTION OF THE PREFERRED EMBODIMENT

Figure 1:
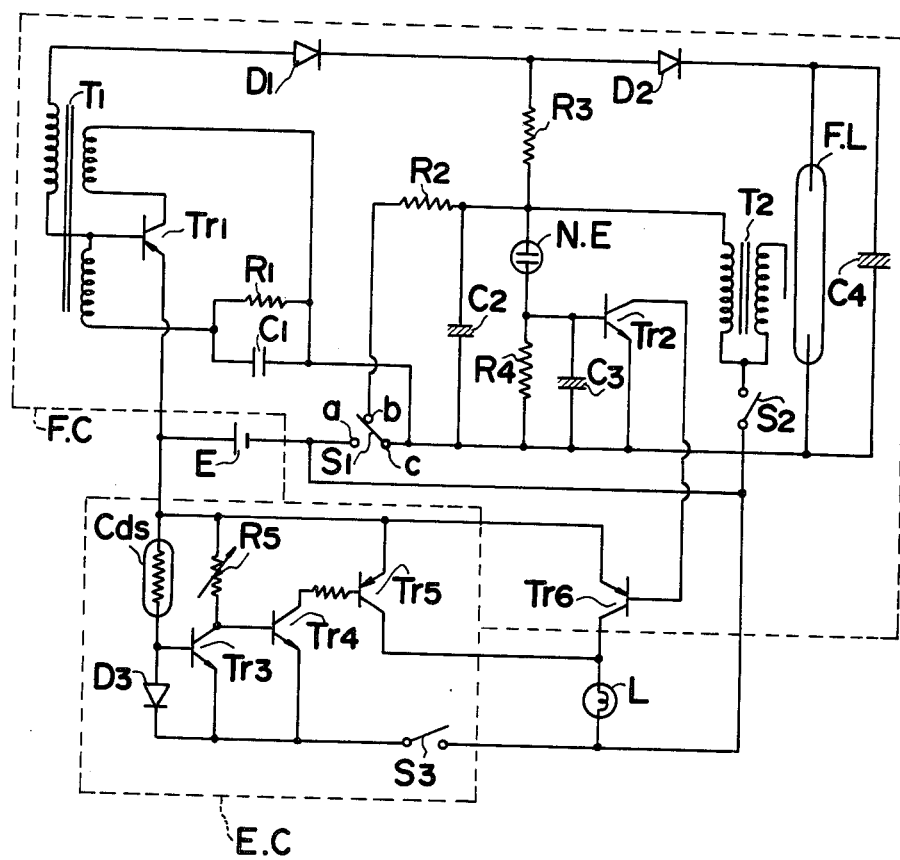
FIG. 1 is a circuit diagram illustrating a preferred embodiment of the present invention.

Referring now to the drawing which illustrates a preferred embodiment of the present invention, the improved network primarily comprises an electronic flash circuit FC and a scene light detecting circuit EC. Part of the flash circuit FC includes a transformer T1, transistor Tr1, resistor R1, and capacitor C1 connected to form and constitute a blocking oscillation circuit of known type and thus a high voltage is applied therefrom via rectifier diodes D1, D2 as a charge on main capacitor C4. When the trigger switch S2 is closed, the charge in trigger capacitor C2 is rapidly discharged and a high voltage produced is the secondary coil in trigger transformer T2 to trigger the flash tube FL.

The trigger capacitor C2 is charged through a resistor R3 along with the charging of main capacitor C4 so that the capacitor C2 serves to detect the charging of the main capacitor as well as to store a charge for the triggering of the flash tube. When main capacitor C4 is charged to a given charge level, then capacitor C2 as well is charged to a voltage corresponding thereto. As a result, a neon tube N.E is lit, while the charge in capacitor C2 is discharged via neon tube N.E and resistor R4. When the voltage in capacitor C2 is lowered sufficiently, then neon tube N.E is extinguished. In addition, when capacitor C2 is charged to a given charge level, then neon tube N.E is lit. In this manner, oscillation occurs. The oscillation signal thus produced is fed to the base of transistor Tr6 via resistor R4, oscillation-duration-adjusting capacitor C3, and transistor Tr2, so that transistor Tr6 is rendered conductive during the time during which neon tube N.E remains lit, with the result that indicating lamp L repeats flashing. In other words, capacitor C2, neon tube N.E, resistors R3, R4 constitute an oscillation circuit adapted to cause flashing of indicating lamp L, when main capacitor C4 is charged to a given charge level.

The exposure warming circuit E.C. includes a photoconductive element Cds and a diode D3 connected in series, the terminal voltage across the diode D3 being applied to the input of a transistor Tr3. Thus, when the brightness of an object or the light incident on photoconductive element Cds is sufficiently high and the resistance of photoconductive element Cds is low, then a sufficient amount of a current flows to diode D3, so that its terminal voltage renders transistor Tr3 conductive, so that transistors Tr4 and Tr5 remain open or cut off. When the brightness of an object becomes lower than a given level, the resistance of photoconductive element Cds becomes extremely high, so that the amount of a current flowing to diode D3 is reduced and the voltage across diode D3 is lowered, so that transistor Tr3 remains cut-off. As a result, a current flows through resistor R5 to the base of transistor Tr4, so that transistor Tr4 becomes conductive, and so does transistor Tr5, thereby energizing and lighting incandescent indicating lamp L continuously.

When terminal C of the transfer arm of a change-over switch S1 is connected to the terminal a thereof, then power source E is connected to the flash tube circuit so as to bring the same into an operable condition. On the other hand, when terminal c is connected to terminal b, then the charge in capacitor C2 is discharged through resistor R2 and, accordingly, even if the main capacitor C4 is charged to a given level, flash tube F.L is not triggered, when trigger switch S2 is closed, and indicating lamp L is not lit. Meanwhile, when capacitor C2 is discharged via changeover switch S1, since diode D2 is connected between capacitor C2 and main capacitor C4 in the forward direction, main capacitor C4 is not discharged. Stated differently, with the aforesaid circuit arrangement, the flash tube circuit may be brought into an inoperable condition, without discharging main capacitor C4. Switch S3 is closed in response to the depression of the shutter release button in the associated camera.

With the aforesaid arrangement, in case terminal C of changeover switch S1 is connected to terminal a, when the voltage at main capacitor C4 exceeds a given level, then indicating lamp L is periodically lit. At this time, when a shutter release button is depressed down slightly to close switch S3 then indicating lamp L remains periodically flashing, in case the brightness of an object is high. In addition, when the brightness of an object is lower than a given level, then the indicating lamp L continues lighting. This indicates the condition of brightness of an object, and thus the photographer can discriminate between a case where flash photography is taken for a dark object, and a case where flash light is used as auxiliary light for a bright object.

In order to confirm the charge condition of the main capacitor, then a shutter release button should be released. When the shutter release button is further depressed, then the shutter is opened, and the trigger switch is closed in synchronism therewith, and flash tube F.L is fired. Meanwhile, in case an oscillation frequency of the aforesaid oscillation circuit is set to a degree that flashing of flash unit may be recognized by the eye, then a difference in indicating mode as has been described earlier may be achieved. Alternatively, the frequency of oscillation in the oscillation circuit may be reduced as compared with the aforesaid degree of frequency, while a difference in indication between a charge completion and exposure warning may be discriminated due to the bright or dim light from a lamp.

According to the indicating device of the present invention, warning of low scene brightness and indication of charge completion in a main capacitor of a flash circuit may be indicated by a single indicating element, and yet the aforesaid indications are given by actuation of the indicating element. In addition, these two kinds of indications may be discriminated from each other, so that indication may be effectively given by a single indicating element.

In addition, a flash-tube-triggering capacitor is connected in an oscillation circuit which produces a flash indication representing the completion of the charge of the main capacitor, so that the device may be highly simplified.

Furthermore, in the case where the trigger capacitor is used as an oscillating capacitor, and the trigger capacitor is short-circuited to be discharged, thereby disabling the flashing of the flash tube, then the indicating device is not operated, and the indication representing the completion of charge is given, only when the flash tube can emit a flash light.

While there has been described and illustrated a preferred embodiment of the present invention, it is apparent that numerous alterations, omissions and additions may be made without departing from the spirit thereof.

We claim:

1. In a camera provided with an electronic photoflash network including a main flash capacitor, an indicator device comprising a photosensitive element, means responsive to the light incident on said photosensitive element being below a predetermined level for producing a first electrical signal, means responsive to the charge on said capacitor exceeding a predetermined level for producing a second electrical signal, a first of said signals being a steady state signal and the second of said signals being an oscillating signal at a frequency in the range of visual perception an electrically energized light emitting member, and means responsive to said first and second signals for respectively continuously and intermittently energizing said light emitting member.

2. An indicating device for use in a camera including a shutter release comprising:
   an electrically energizable light emitting indicating element;
   a photosensitive element;
   exposure warning means for continuously energizing said indicating element, only when the light incident on said photosensitive element is lower than a given level;
   a photoflash network including a main capacitor and a power source; and
   an oscillation circuit for intermittently energizing said indicating element and producing an oscillatory indication only when said main capacitor is charged over a given level;
   said exposure warning means being operable in association with the operation of said shutter release and said oscillation circuit becomes operable, when said power source is connected to said flash circuit.

3. An indicating device as set forth in claim 2, wherein the frequency of oscillation of said oscillation circuit is in the range of visual perceptability.

4. An indicating device as set forth in claim 2 wherein said indicating element is positioned in a manner visible in a finder field of view of a camera.

5. In a camera provided with an electronic photoflash network including a main flash capacitor, an indicator device comprising a photosensitive element, means responsive to said photosensitive element for producing a first electrical signal, means responsive to the charge on said capacitor for producing a second electrical signal, a first of said signals being a steady state signal and the second of said signals being an oscillating signal at a frequency in the range of visual perception, an electrically energized light emitting member, and means responsive to both of said signals for energizing said light emitting member and comprising a source of current and a pair of transistors respectively controlled by said first and second signals to render the respective transistors correspondingly continuously conductive in response to said first signal and correspondingly intermittently conductive in response to said second signal and means series connecting said light emitting member through the outputs of both of said transistors connected in parallel to said source of current.

6. The device of claim 5 wherein said first signal is responsive to the light incident on said photosensitive element being below a predetermined level to energize said light emitting member.

7. The device of claim 5 wherein said second signal is responsive to the charge on said capacitor being at least a predetermined value to energize said light member.

8. An indicating device for use in a camera including a shutter release comprising:
an indicating element;
a photosensitive element;
exposure warning means capable of operating said indicating element, when the light incident on said photosensitive element is lower than a given level;
a photoflash network including a main capacitor, a flash tube triggering capacitor and a power source;
an oscillation circuit including said flash tube triggering capacitor as an oscillating capacitor for intermittenly operating said indicating element and producing an oscillatory indication when said main capacitor is charged over a given level;
said exposure warning means being operable in association with the operation of said shutter release and said oscillation circuit becomes operable, when said power source is connected to said flash circuit.

9. An indicating device as set forth in claim 8, wherein said indicating element consists of an electrically energized light emitting element.

10. An indicating device as set forth in claim 8, said oscillation circuit includes a series connected discharge tube and resistor connected in parallel with the oscillating capacitor, whereby an output transistor may be controlled according to a terminal voltage of said resistor.

11. An indicating device as set forth in claim 10, wherein a delay capacitor is provided between the opposite terminals of said resistor.

12. An indicating device as set forth in claim 8, wherein there is provided a short-circuiting switch for shortcircuiting a trigger capacitor to thereby disable the flashing of the flash tube.

13. An indicating device as set forth in claim 8 wherein the frequency of oscillation of said oscillation circuit is in the range of visual perceptability.

14. An indicating device as set forth in claim 8 wherein said indicating element is positioned in a manner visible in the finder field of view of the camera.

15. In a camera provided with an electronic photoflash network including a photoflash tube and a main flash capacitor and a flash tube triggering capacitor, an indicator device comprising a photosensitive element, means responsive to said photosensitive element for producing a first electrical signal, means responsive to the charge on said capacitor for producing a second electrical signal and including an R C relaxation oscillator including said triggering capacitor as the capacitor component thereof, a first of said signals being a steady signal and the second of said signal being an oscillating signal at a frequency in the range of visual perception, an electrically energized light emitting member, and means responsive to both of said signals for energizing said light emitting member.

* * * * *